United States Patent
Pyle

[15] 3,682,194
[45] Aug. 8, 1972

[54] CONDENSATE VALVE
[72] Inventor: Kenneth E. Pyle, Marine City, Mich.
[73] Assignee: Reef-Baker Corporation, East Detroit, Mich.
[22] Filed: April 24, 1970
[21] Appl. No.: 31,649

[52] U.S. Cl. ............................................... 137/204
[51] Int. Cl. ........................................... F16t 1/00
[58] Field of Search ................................. 137/204

[56] References Cited
UNITED STATES PATENTS

| | | |
|---|---|---|
| 2,572,311 | 10/1951 | Burd ........................... 137/204 |
| 2,591,432 | 4/1952 | Hoerner ................. 137/204 X |
| 2,739,605 | 3/1956 | Smith ......................... 137/204 |
| 2,810,393 | 10/1957 | Fites .......................... 137/204 |

Primary Examiner—Alan Cohan
Attorney—Whittemore, Hulbert and Belknap

[57] ABSTRACT

The condensate valve comprises a housing having a chamber for the accumulation of liquid, and a double-acting valve for closing an outlet from the chamber. The valve is moved in one direction by fluid pressure and in the other direction by a spring when the fluid pressure is relieved.

1 Claim, 1 Drawing Figure

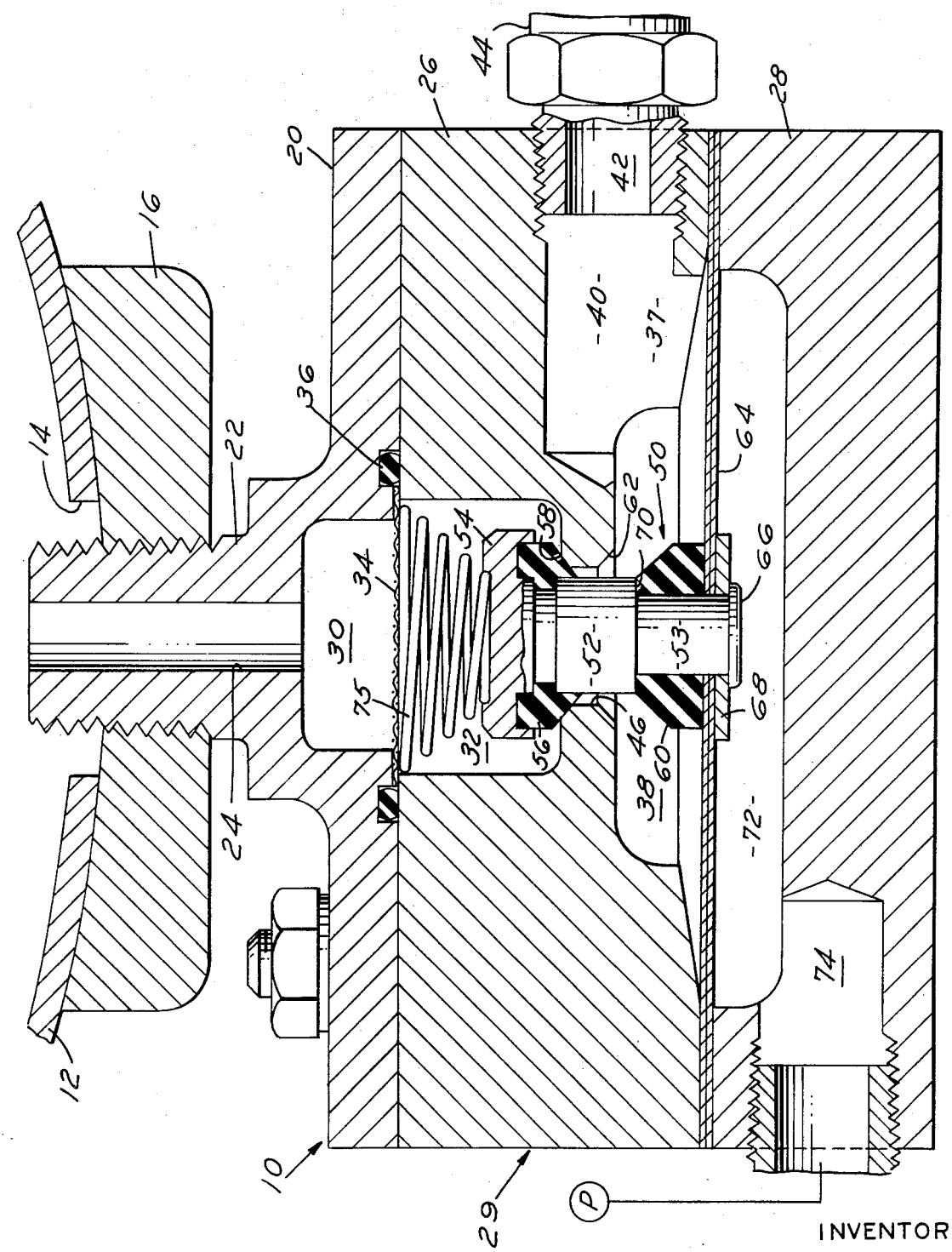
INVENTOR
KENNETH E. PYLE

CONDENSATE VALVE

SUMMARY OF THE INVENTION

One object of this invention is to provide an improved condensate valve having a double-acting valve for controlling the outlet of liquid from the liquid chamber.

Another object is to provide a condensate valve having a reciprocable double-acting valve member capable of closing the outlet from the liquid chamber at the opposite limits of its movement but opening the liquid chamber to the outlet in intermediate positions thereof.

Another object is to provide a condensate valve in which the valve member is moved in one direction to one limit by fluid pressure and is moved to its opposite limit by spring means when the fluid pressure is relieved.

Another object is to provide a condensate valve having an outlet from the liquid chamber which includes a relatively narrow passage, and a reciprocable double-acting valve member having sealing means at opposite ends engageable with seats formed at the ends of the passage to close the liquid chamber at the limits of reciprocatory movement of the valve member.

Other objects and features of the invention will become apparent as the description proceeds, especially when taken in conjunction with the accompanying drawing, wherein:

The single FIGURE of the drawing is a central vertical sectional view of a condensate valve constructed in accordance with my invention shown connected to an air or gas supply tank.

The condensate or drain valve is shown connected to an air or gas supply tank to remove condensate therefrom. The tank may, for example, be of the type used on vehicles to provide a supply of compressed air for operating the brakes. However, it should be understood that the condensate valve is useful in connection with other types of tanks and for other purposes whether or not the tank contains air or gas and whether or not the pressure in the tank is maintained above atmospheric pressure.

Referring now more particularly to the drawing, the valve is generally designated 10 and is shown as being screw threaded into an opening in the bottom of the tank 12 which may be adapted to contain a supply of air or gas to be used for diversified purposes, which supply of air or gas is preferably under a pressure above atmospheric pressure. Specifically, the bottom wall of the tank has an opening 14 over which is secured the internally threaded member 16. The cap 20 of the condensate valve 10 has a vertically upwardly extending tubular stem 22 which threads through the member 16 into the opening 14 in tank 12. Thus condensate in tank 12 may drain into the condensate valve through the open-ended vertical passage 24 in stem 22 of cap 20.

The condensate valve 10 as already stated has a cap 20, and also has an upper body 26 and a lower body 28. Essentially, the cap 20 and upper and lower bodies 26 and 28 make up the housing of the valve which is designated 29.

A cavity 30 is formed centrally in the lower surface of the cap 20, in communication with the passage 24.

A liquid accumulation chamber 32 is formed centrally in the upper surface of the upper body 26 in alignment and in communication with the cavity 30. A screen 34 extends between the cavity 30 and the liquid accumulation chamber 32, being clamped around the peripheries of the cavity and the chamber between the adjacent surfaces of the cap 20 and the body 26. The screen 34 is provided to prevent solids and other impurities from entering the liquid accumulation chamber 32. An annular O-ring seal 36 is disposed in an annular groove formed in the bottom surface of cap 20 around cavity 32 to seal against the upper surface of upper body 26 around the periphery of the liquid accumulation chamber.

An outlet 37 is provided for exhausting liquid from chamber 32, such outlet including a central chamber 38 formed in the lower portion of body 26 which leads to a passage 40 terminating in an outlet port 42 which may open directly into the atmosphere or which may lead to an outlet line 44. A vertical passage 46 extends through partition 47 from the liquid accumulation chamber 32 to chamber 38.

A vertically reciprocable double-acting valve member 50 extends through the passage 46. The valve member 50 has an elongated vertical body or stem 52 which is of smaller diameter than the passage 46. The valve member 50 has an enlarged head 54 at its upper end disposed in the liquid accumulation chamber 32. Beneath the head 54 and surrounding the stem 52 is an annular sealing member 56 of rubber or like material which is engageable with the valve seat 58 formed around the upper end of passage 46. The lower end portion of the stem 52 is reduced in diameter as shown at 53, and an annular sealing member 60 of rubber or the like surrounds the lower reduced portion 53 and is engageable with the valve seat 62 formed around the lower end of passage 46. It will be apparent that when the valve member 50 is at the lower limit of its movement, as shown in FIG. 1, the sealing member 56 engages the seat 58 to close the chamber 32 and prevent the outflow of liquid therefrom, and that in the upper limit of the valve member the sealing member 60 engages the valve seat 62 likewise to close the accumulation chamber 32 and prevent the outflow of liquid therefrom. However, in intermediate positions of the valve member 50, liquid collected in the accumulation chamber 32 may pass through the annular space between the stem 52 of the valve member and passage 46 and be discharged through the chamber 38, passage 40 and port 42.

The lower boundary of the chamber 38 in the upper body 26 is defined by a flexible diaphragm 64 which is clamped between the upper and lower bodies 26 and 28 of housing 29. The lower reduced portion 53 of valve stem 52 extends through the diaphragm 64 and has a head 66 on the lower end. The diaphragm is clamped to the reduced portion 53 of the stem 52 between a washer 68 and the sealing member 60, the upper end of the sealing member 60 bearing against an annular shoulder 70 on the stem 52.

A pressure chamber 72 is formed in the upper surface of the lower body 28. The upper boundary of the pressure chamber 72 is defined by the diaphragm 64. An inlet passage 74 leads to the pressure chamber 72 and places the pressure chamber 72 in communication with any suitable source of pressure generally designated P.

A compression coil spring 75 is provided in accumulation chamber 32, bearing against the undersurface of cap 20 and against the head 54 of the valve member 50. The spring 75 urges the valve member 50 in a downward direction and moves it to the position illustrated in the drawing when pressure is relieved in pressure chamber 72.

In use, the condensate valve 10 will be connected to the tank 12 as shown in the drawing. If this valve is used in connection with the air brake system of a vehicle, the line connected to the brake system may also direct pressure to the condensate valve in the chamber 72 to raise the valve member 50 against the force of spring 75 from the position shown in the drawing to its upper limit in which the sealing member 60 closes on the seat 62 whenever the brakes are applied. Then when the brakes are released, the pressure in the pressure chamber 72 will be relieved and the spring 75 will return the valve member 50 to its lower limit causing sealing member 56 to close on seat 58 and again close the liquid chamber 32. While the valve member 50 is between its limits, that is during the time it is moving from one limit to the other, liquid in the accumulation chamber 32 will be discharged through the outlet 37. If there is pressure above atmospheric in the tank 12 this pressure will serve to blow out the accumulated liquid in chamber 32.

In some instances, the condensate valve 10 may be used with a tank whose pressure is maintained by an air compressor which has a regulating or unloading device to operate a relief valve when the regulated pressure in the tank has been reached. Air from the unloading device would then be piped to the pressure chamber 72 of the condensate valve to raise it to its upper limit. Then when the tank pressure drops below the regulated air pressure, the air from the compressor would no longer be directed to the pressure chamber 72 in the condensate valve but would be delivered to the tank to build up its pressure again. Hence the pressure in the chamber 72 would be relieved so that the valve member 50 might return by spring pressure to the illustrated position.

It should be noted that the valve member 50 operates twice each time air under pressure is intermittently applied to the pressure chamber 72, once when the air pressure is initially supplied to the chamber and a second time when it is relieved. During each such interval of movement of the valve member 50, liquid in the chamber 32 is relieved.

What I claim as my invention is:

1. A condensate valve comprising a housing, a liquid chamber in the upper portion of said housing for the accumulation of liquid, a liquid inlet to said liquid chamber, a second chamber in said housing beneath said liquid chamber having an outlet port, said housing having a partition separating said chambers, a narrow passage extending downward through said partition from said liquid chamber to said second chamber, an elongated upright valve member vertically reciprocable in said passage, said valve member having a sealing member at the upper end disposed in said liquid chamber and having a sealing member at the lower end disposed in said second chamber, said partition having valve seats at opposite ends of said passage, said sealing members being engageable with said valve seats at the opposite limits of vertical movement of said valve member to close said passage against the flow of liquid from said liquid chamber, said valve member having a stem rigidly connecting said sealing members for movement of said sealing members in unison, said stem being of reduced diameter relative to said passage so as to allow liquid to pass from said liquid chamber to said second chamber when said valve member is between its opposite limits, a flexible diaphragm defining the bottom of said second chamber, a pressure chamber in said housing beneath and separated from said second chamber by said diaphragm, the lower end portion of said valve member being rigidly connected to said diaphragm, said valve member being movable to its upper limit by pressure in said pressure chamber, spring means for moving said valve member to its lower limit when the pressure in said pressure chamber is relieved, said spring means being located in said liquid chamber and acting upon the upper end of said valve member, said housing having an upper separable part closing said liquid chamber and presenting an annular shoulder, said spring means pressing against said shoulder, and a screen clamped over said spring means by said separable part between said inlet and said liquid chamber.

* * * * *